United States Patent
Okonkwo

(10) Patent No.: US 9,220,365 B1
(45) Date of Patent: Dec. 29, 2015

(54) ELECTROMAGNET FOR FASTENING COOKWARE TO A STOVETOP ELEMENT

(71) Applicant: Chinwe Okonkwo, Dix Hills, NY (US)

(72) Inventor: Chinwe Okonkwo, Dix Hills, NY (US)

(*) Notice: Subject to any disclaimer, the term of this patent is extended or adjusted under 35 U.S.C. 154(b) by 0 days.

(21) Appl. No.: 14/260,132

(22) Filed: Apr. 23, 2014

(51) Int. Cl.
| | |
|---|---|
| *H01F 7/20* | (2006.01) |
| *A47J 36/34* | (2006.01) |
| *H05B 3/68* | (2006.01) |
| *F24C 15/10* | (2006.01) |
| *H01F 7/06* | (2006.01) |

(52) U.S. Cl.
CPC .............. *A47J 36/34* (2013.01); *F24C 15/107* (2013.01); *H01F 7/06* (2013.01); *H05B 3/685* (2013.01)

(58) Field of Classification Search
CPC .................................................... B23Q 3/1543
USPC ........................................................ 335/289
See application file for complete search history.

(56) References Cited

U.S. PATENT DOCUMENTS

| | | | |
|---|---|---|---|
| 2,497,753 A | 2/1950 | Arnot | |
| 2,678,991 A * | 5/1954 | Amfitheatrof | 219/457.1 |
| 3,134,007 A | 5/1964 | Niblo | |
| 3,796,850 A | 3/1974 | Moreland, II et al. | |
| 6,031,209 A * | 2/2000 | Wiesman | 219/447.1 |
| 6,300,603 B1 * | 10/2001 | Edwards et al. | 219/447.1 |
| 7,135,658 B2 | 11/2006 | Rael | |
| 7,151,428 B2 * | 12/2006 | Flood | 335/285 |
| 7,355,151 B2 | 4/2008 | Rael | |
| 7,667,161 B2 | 2/2010 | Rael | |
| 8,164,029 B2 | 4/2012 | Rael | |
| 8,618,448 B2 * | 12/2013 | Alexander | 219/432 |
| 2005/0269314 A1 * | 12/2005 | Rael | 219/620 |
| 2010/0000980 A1 * | 1/2010 | Popescu | 219/201 |

FOREIGN PATENT DOCUMENTS

GB     2218883     11/1989

* cited by examiner

*Primary Examiner* — Alexander Talpalatski
(74) *Attorney, Agent, or Firm* — Michael I. Kroll

(57) ABSTRACT

An electromagnetic appliance for stovetop cookware comprising an electromagnetic plate-like appliance position able on a stove surface element having a switch for generating a magnetic field so that when paramagnetic cookware is placed on the electromagnetic plate-like appliance and the electromagnet is energized, the superjacent cooking ware will be magnetically prevented from accidental movement of the cookware without de-energizing the electromagnet.

7 Claims, 6 Drawing Sheets

ELECTROMAGNET FOR FASTENING COOKWARE TO A STOVETOP ELEMENT

BACKGROUND OF THE INVENTION

1. Field of the Invention

The present invention relates generally to cookware and, more specifically, to a stovetop cookware anchor comprising an electromagnetic plate-like appliance placed on a stove surface element having a switch for generating a magnetic field so that when metal cookware is placed on the electromagnetic plate-like appliance and the electromagnet is energized, the superjacent cooking ware will be magnetically prevented from accidental movement without de-energizing the electromagnet.

2. Description of the Prior Art

There are other devices which provide for holding cookware. While these devices may be suitable for the purposes for which they where designed, they would not be as suitable for the purposes of the present invention as heretofore described.

It is thus desirable to provide a device for holding cookware to a stove top element comprising a planar appliance having a selectively engageable electromagnet therein.

It is further desirable to provide means for anchoring in use cookware to a stove top element to prevent injury by positioning the electromagnetic anchoring device over the stove top element then positioning cookware over the anchoring device then energizing the anchoring device that will prevent movement of the anchored cookware until the electromagnetic anchoring device is de-energized.

SUMMARY OF THE PRESENT INVENTION

A primary object of the present invention is to provide magnetic securing means holding metal cookware to a stovetop appliance cooking element.

Another object of the present invention is to provide magnetic securing means between metal cookware and said cooking appliance that is user selectively engaged and disengaged by a switch.

Yet another object of the present invention is to provide metal cookware with magnetic securing means to a stovetop appliance element comprising a plate-like housing incorporating an electromagnet having switch means for engaging and disengaging the electromagnet thereby providing a magnetic field between a stovetop element, such as an electric hot plate coil and the metallic cookware.

Still yet another object of the present invention is to provide an electromagnetic appliance having a bottom surface and a top surface with a peripheral wall therebetween forming cavity for an electromagnet therein.

Another object of the present invention is to provide an electromagnetic appliance having a circuit incorporating an AC or DC electromagnet with a lead extending to a respective AC or DC power source providing a continuous energy source to generate a magnetic field.

Additional objects of the present invention will appear as the description proceeds.

The present invention overcomes the shortcomings of the prior art by providing a stovetop cookware anchor comprising an electromagnetic plate-like appliance positionable over a stove surface element having a switch for generating a magnetic field so that when metal cookware is placed on the electromagnetic plate-like appliance and the electromagnet is energized, the superjacent cooking ware will be magnetically prevented from accidental movement without de-energizing the electromagnet.

DESCRIPTION OF THE REFERENCED NUMERALS

Turning now descriptively to the drawings, in which similar reference characters denote similar elements throughout the several views, the Figures illustrate the electromagnetic appliance of the present invention. With regard to the reference numerals used, the following numbering is used throughout the various drawing figures.

10 Electromagnetic Appliance of the present invention
12 stove appliance
14 element of 12
16 cookware
18 base of cookware
20 hot plate of 12
22 AC cord of 20
24 temperature switch of 20
26 power source of 20
28 housing of 10
30 top surface of 28
32 bottom surface of 28
34 wall of 28
36 handle grip of 28
38 electromagnet
40 switch of 38
42 AC cord
44 magnetic field of 38
46 on/off state visual indicator The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
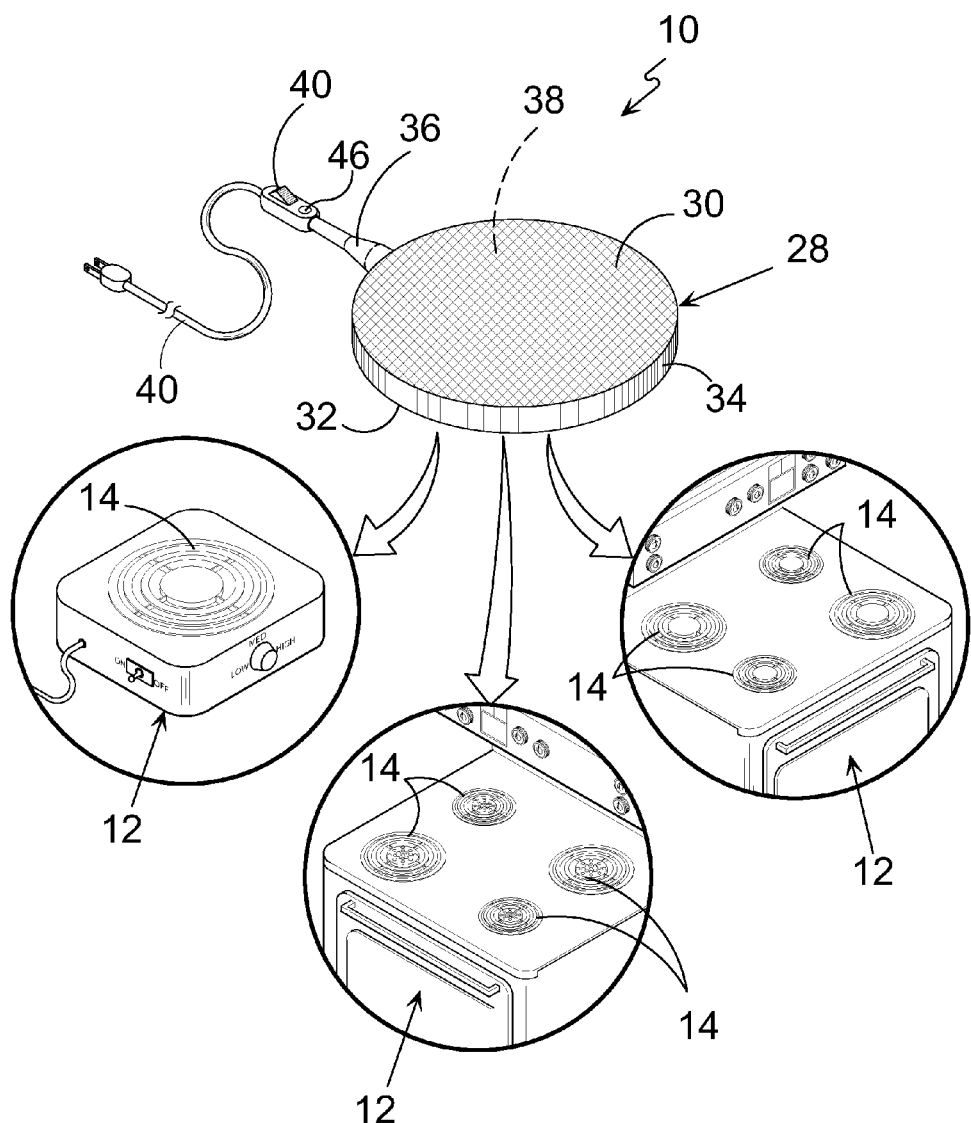
FIG. 1 is an illustrative view of an electromagnetic appliance for stovetop appliances.

Referring to FIG. 1, shown is an illustrative view of an electromagnetic appliance for stovetop appliances. The present invention is a stove top 12 cookware anchor comprising an electromagnetic appliance 10 for magnetically holding metal cookware 16 to a stove surface element 14 to prevent movement of said cookware 16 during use. More specifically, the electromagnetic appliance 10 serves as an aid to prevent injury while using small tabletop hot plate cooking appliances 20, including gas and electric appliances. The electromagnetic appliance 10, having a switch 40 for engaging and disengaging the electromagnet 38, is positioned on the appliance heating element 14, where then the cookware 16 is placed on the electromagnetic plate 10 and the switch 40 actuated creating a magnetic field between the stove surface element 14 and the metal cookware 16, which will prevent movement of the cookware. Turning the electromagnet 38 off via switch 40 allows removal of the metal cookware from the cooking appliance 12.

Figure 2:
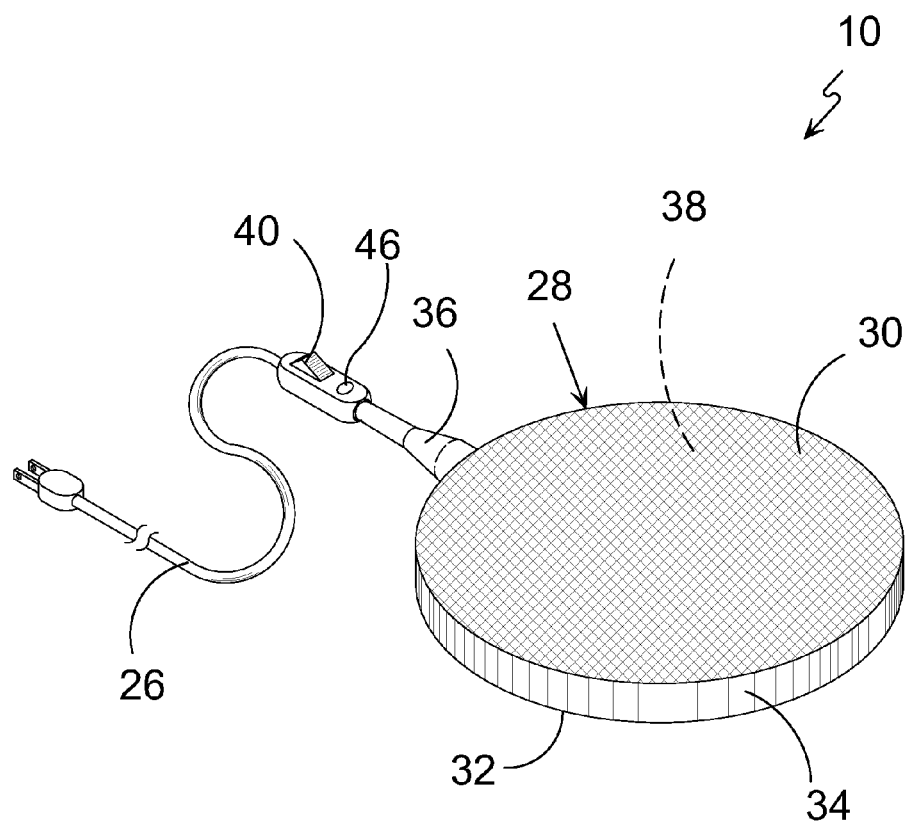
FIG. 2 is a perspective view of the electromagnetic appliance of the present invention.

Referring to FIG. 2, shown is a perspective view of the electromagnetic appliance of the present invention. Shown is the electromagnetic appliance 10 for magnetically holding metal cookware to a stove surface element 14 to prevent movement of said cookware 16 during use. The electromagnetic appliance 10 comprises housing 28 having a top surface 30, bottom surface 32 with peripheral wall 34 extending therebetween creating a compartment having electromagnet 38 within said compartment. Further providing handle 36 extending from sidewall 32 incorporating switch 40 for activating electromagnet 38 and indicator 46 serving as visual indicator for the electromagnetic appliance on/off state, having a switch 40 for engaging and disengaging the electromagnet 38, is positioned on the appliance heating element 14, where then the cookware 16 is placed on the electromagnetic plate 10 and the switch 40 actuated creating a magnetic field between the stove surface element 14 and the metal cookware 16, which will prevent movement of the cookware. Turning the electromagnet 38 off via switch 40 allows removal of the metal cookware from the cooking appliance 12.

Figure 3:
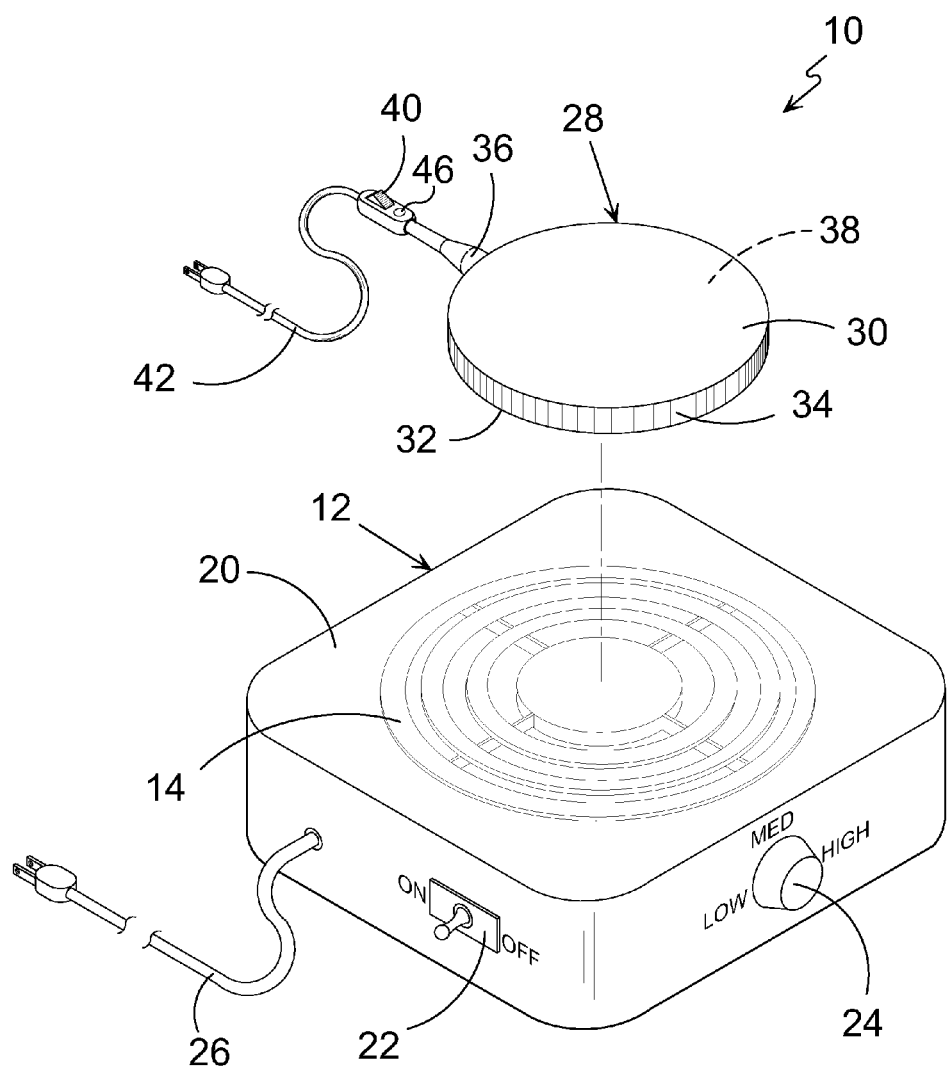
FIG. 3 is an illustrative view of the electromagnetic appliance for stovetop appliances.

Referring to FIG. 3, shown is an illustrative view of the electromagnetic appliance for stovetop appliances. The present invention provides an electromagnetic appliance 10 having housing 28 comprising paramagnetic top surface 30, paramagnetic bottom surface 32 with wall 34 encompassing a compartment having electromagnet 38 therein. Further provided is handle 36 having switch 40 and on/off visual indicator 46 with electrical lead 42 extending between an AC or DC power source and the electromagnet 38. Illustrated is a hot plate 20 tabletop stove appliance 12 having AC cord 26, power switch 22 and temperature selector control 24 with a top surface plug-in burner element 14. Once the electromagnetic appliance is placed on a paramagnetic burner element 14 and energized through switch 40, a magnetic field generated by electromagnet 38 holds the electromagnetic appliance to said burner element 14 until electromagnet 38 is powered off allowing removal of the electromagnetic appliance from the table top stove appliance 20.

Figure 4:
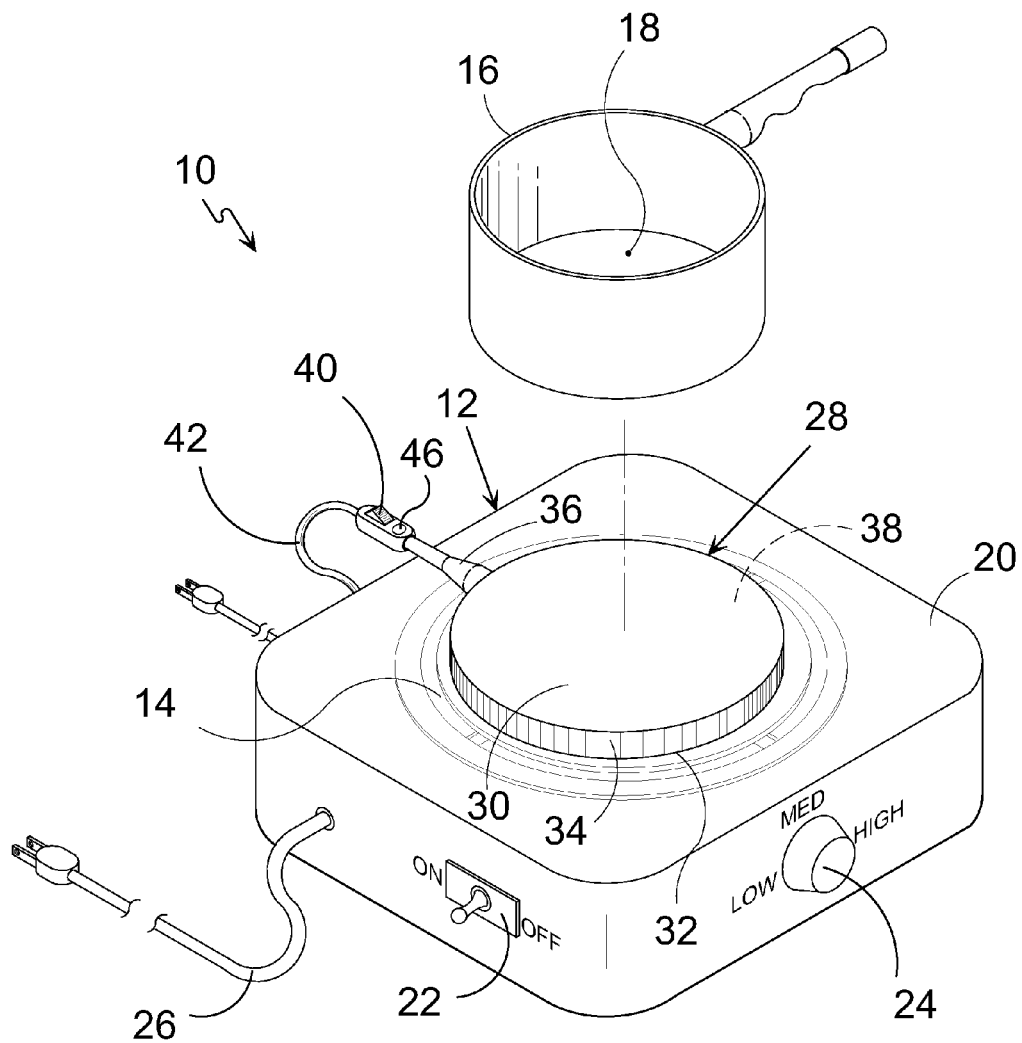
FIG. 4 is an illustrative view of the electromagnetic appliance for stovetop appliances.

Referring to FIG. 4, shown is an illustrative view of the electromagnetic appliance for stovetop appliances. As aforementioned, the electromagnetic appliance 10 has housing 28 comprising paramagnetic top surface 30, paramagnetic bottom surface 32 with wall 34 encompassing a compartment having electromagnet 38 therein. Further provided is handle 36 having switch 40 and on/off visual indicator 46 with electrical lead 42 extending between an AC or DC power source and the electromagnet 38. Illustrated is a hot plate 20 tabletop stove appliance 12 having AC cord 26, power switch 22 and temperature selector control 24 with a top surface plug-in burner element 14. Positioned on element 14 is the electromagnetic appliance 10 wherethen cookware 16 having paramagnetic base 18 is placed on the electromagnetic appliance 10 so that when switch 40 is activated a magnetic field, shown in FIG. 6, will hold the cookware to surface 30 until switch 40 is turned off.

Figure 5:
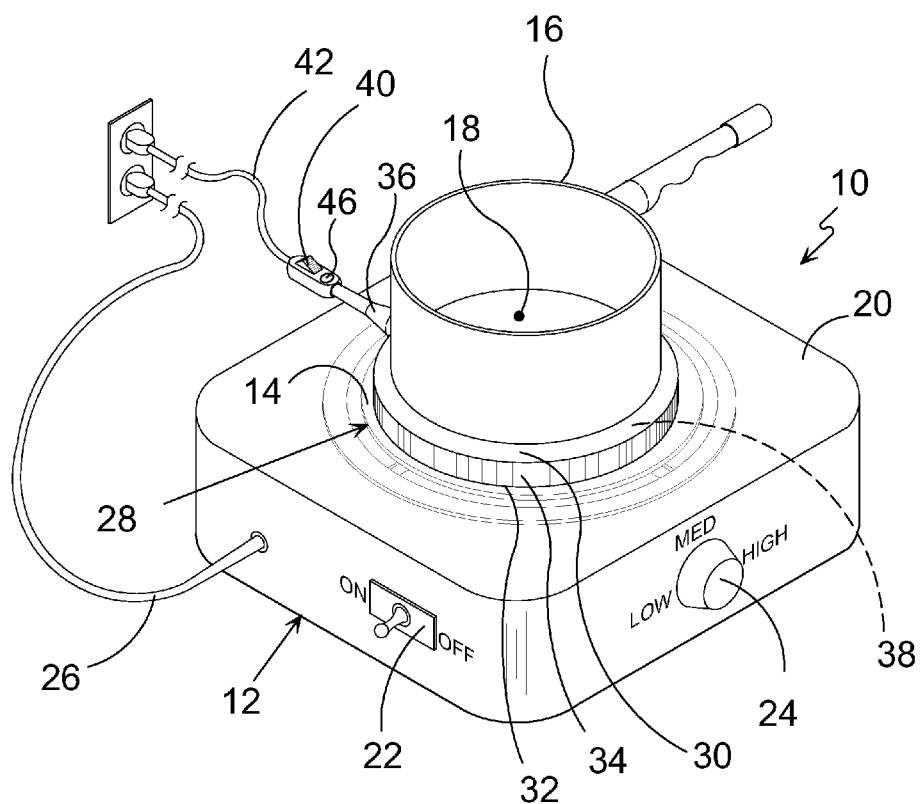
FIG. 5 is an illustrative view of the electromagnetic appliance anchoring cookware to a hot plate burner element.

Referring to FIG. 5, shown is an illustrative view of the electromagnetic appliance anchoring cookware to a hot plate burner element. Kitchen appliance stoves having burner elements or grates positioned over a heat source can be dangerous, not only to the general public use, but especially hazardous to young children and the elderly where injuries are higher than the general public. Many of these accidents occur through children grabbing stove top cookware handles spilling the cookware content on themselves and through cookware handles extending beyond the stove appliance where movement of the cookware can easily knock the cookware off the burner scalding or burning users. The present invention is designed to reduce the number of accidents, especially to small children and the elderly by providing an electromagnetic appliance that creates a magnetic field extending between a paramagnetic stove element and cookware placed on the electromagnetic appliance so that when the electromagnetic appliance is activated cookware will remain magnetically latch to kitchen appliance stove top elements. The electromagnetic appliance of the present invention provides an electromagnetic appliance 10 having housing 28 comprising paramagnetic top surface 30, paramagnetic bottom surface 32 with wall 34 encompassing a compartment having electromagnet 38 therein. Further provided is handle 36 having switch 40 and on/off visual indicator 46 with electrical lead 42 extending between an AC or DC power source and the electromagnet 38. Illustrated is a hot plate 20 tabletop stove appliance 12 having AC cord 26, power switch 22 and temperature selector control 24 with a top surface plug-in burner element 14. Once the electromagnetic appliance is placed on a paramagnetic burner element 14 and energized through switch 40, a magnetic field generated by electromagnet 38 holds the electromagnetic appliance to said burner element 14 until electromagnet 38 is powered off allowing removal of the electromagnetic appliance from the table top stove appliance 20.

Figure 6:
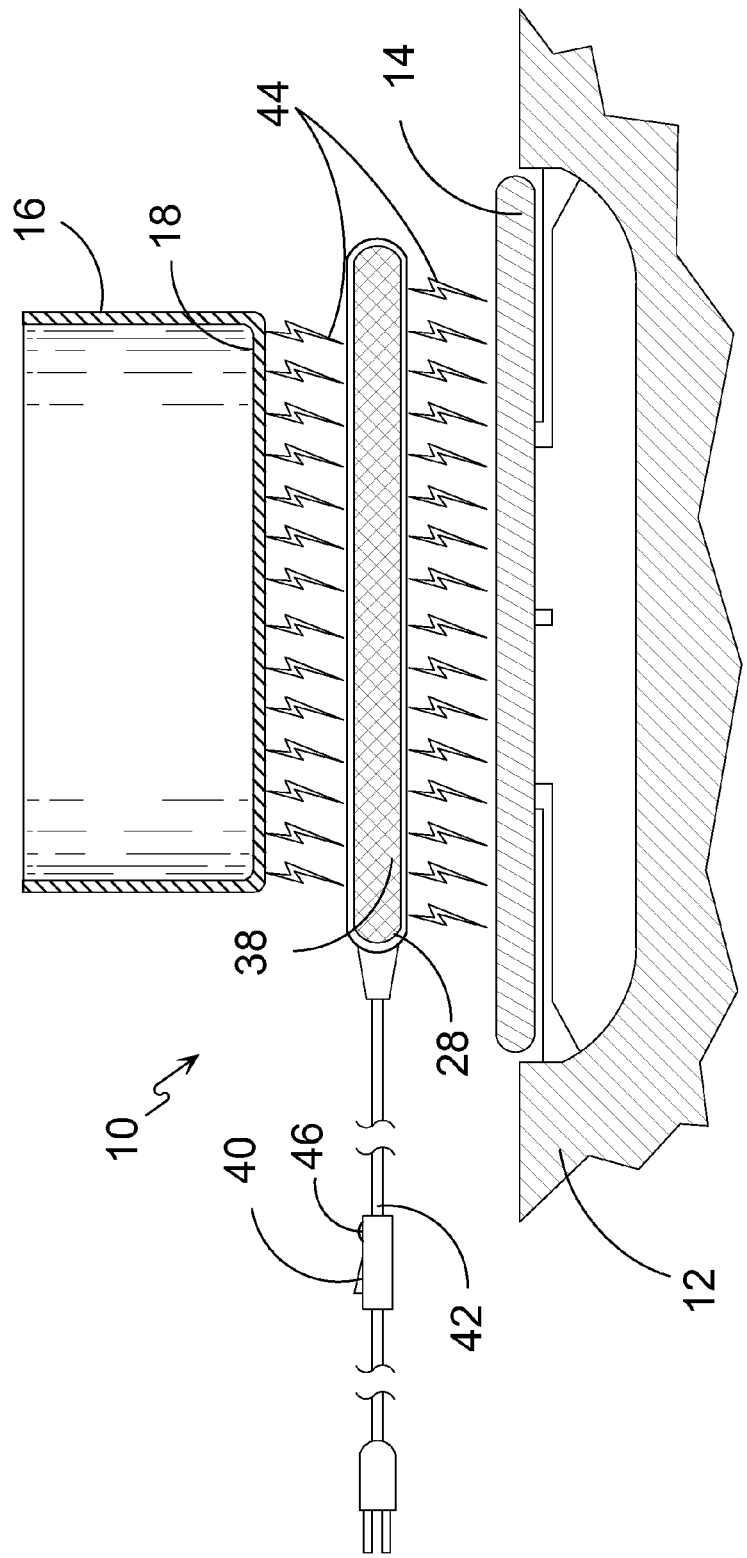
FIG. 6 is a cutaway view of the electromagnetic appliance in use.

Referring to FIG. 6, shown is a cutaway view of the electromagnetic appliance in use. Illustrated is a stove appliance 12 having element 14 with electromagnetic appliance 10 placed on paramagnetic burner element 14 and cookware 16 having paramagnetic base 18 place on the electromagnetic appliance wherethen the electromagnet 38 is energized through switch 40, a magnetic field generated by electromagnet 38 holds the electromagnetic appliance 10 to said burner element 14 until electromagnet 38 is powered off via switch 40 allowing removal of cookware 18 from the stove appliance 12.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent and is set forth in the appended claims:

1. An electromagnetic appliance for holding paramagnetic cookware to a stove appliances having at least one plug-in burner element comprising:
    An electromagnetic housing comprising a paramagnetic top surface, a paramagnetic bottom surface, and an outer wall joining said top and bottom surfaces forming an enclosed compartment;
    said housing adapted to be placed on a paramagnetic burner element and to support said paramagnetic cookware on said to surface of said housing;
    a power source connected to said housing;
    an electromagnet fully contained and enclosed within said housing in electrical communication with said power source for providing a magnetic field projecting from both said to and bottom surfaces, said electromagnet extending throughout all of said enclosed compartment for providing a continuous magnetic field over all of said top and bottom surfaces; and
    a switch for activating and de-activating the electromagnet whereby when activated a magnetic field is generated holding the electromagnetic cookware to the burner element.

2. The electromagnetic appliance of claim 1, wherein said electromagnetic appliance housing, comprises:
    a top planar surface and a bottom planar surface having a peripheral wall therebetween forming compartment housing said electromagnet;
    a power cord extending from said electromagnet through said handle to a power source; and
    a switch within said handle for activating and deactivating the electromagnet.

3. The electromagnetic appliance of claim 2, wherein said electromagnetic, appliance handle further provides an on/off state visual indicator.

4. The electromagnetic appliance of claim 3, wherein said power source is an AC power source.

5. The electromagnetic, appliance of claim 3, wherein said power source is a DC power source.

6. An electromagnetic appliance for holding paramagnetic cookware to a stove appliance having a crate of paramagnetic material positioned over a heating element comprising:
    An electromagnetic housing comprising a planar paramagnetic to surface, a planar paramagnetic bottom surface, and an outer wall joining said top and bottom surfaces forming an enclosed compartment;
    said housing adapted to be placed on said grate and to support said paramagnetic cookware on said top surface of said housing;
    a power source connected to said housing;
    an electromagnet fully contained and enclosed within said housing in electrical communication with said power source for providing a magnetic field, projecting from both said top and bottom surfaces, said electromagnet extending throughout all of said enclosed compartment for providing a continuous magnetic field over all of said top and bottom surfaces; and
    a switch for activating and de-activating the electromagnet whereby when activated a magnetic field is generated holding the electromagnetic cookware to the grate.

7. A method of securing a cookware of electromagnetic material to a burner of paramagnetic material or a grate of paramagnetic material over a source of heat consisting of the steps of:
    placing an electromagnetic housing comprising a planar paramagnetic top surface, a planar paramagnetic bottom surface, and an outer wall joining said top and bottom surfaces forming an enclosed compartment on said burner or grate, an electromagnet fully contained and enclosed within said housing in electrical communication with an external power source for generating a magnetic field projecting from both said top and bottom surfaces of said housing, said electromagnet extending throughout all of said enclosed compartment for providing a continuous magnetic field over all of said top and bottom surfaces;
    placing said cookware on said top surface of said housing; and
    using a switch connected to said power source for activating and de-activating the electromagnet whereby when activated a magnetic field is generated holding the electromagnetic cookware to the burner or grate and resisting movement of said cookware during use.

* * * * *